United States Patent [19]

Minning et al.

[11] Patent Number: 4,483,458
[45] Date of Patent: Nov. 20, 1984

[54] CLOSURE SYSTEM FOR PRESSURE VESSELS

[75] Inventors: Rudolf Minning, Dortmund; Heribert Dierkes, Hagen; Jörg-Peter Körner, Hagen; Peter Saamer, Iserlohn-Hennen, all of Fed. Rep. of Germany

[73] Assignee: Uhde GmbH, Dortmund, Fed. Rep. of Germany

[21] Appl. No.: 494,423

[22] Filed: May 13, 1983

[30] Foreign Application Priority Data

May 12, 1982 [DE] Fed. Rep. of Germany ....... 3217819

[51] Int. Cl.³ ............................................. B65D 45/32
[52] U.S. Cl. ........................................ 220/320; 220/3
[58] Field of Search ..................................... 220/320, 3

[56] References Cited

U.S. PATENT DOCUMENTS 1,871,834  8/1932  Astrom ................................. 220/320
1,963,675  6/1934  Plainevaux et al. ................. 220/320
4,347,944  9/1982  Moldrup ............................. 220/320

FOREIGN PATENT DOCUMENTS 2455943  6/1976  Fed. Rep. of Germany ...... 220/320

Primary Examiner—Steven M. Pollard
Attorney, Agent, or Firm—Fraser, Barker, Purdue & Clemens

[57] ABSTRACT

The invention relates to a closure system for pressure vessels, the closure consisting of a cover and of two clamp halves each of which can be moved into closing or open position by means of guiding elements. The clamp halves, the cover, and the pressure vessel housing being equipped with stop surfaces, the stop surfaces of the clamp halves being opposite to those of the cover and of the pressure vessel housing in closing position. The closure system is especially suitable in cases where an entirely automatic closing device is required for pressure vessels having an operating pressure of more than 10 bar.

The clamp halves are connected by means of tensible flexible bearings to guiding elements to allow for a cover movement in axial direction. The tension of the flexible bearings is sufficient for automatic resetting of the clamp halves into zero position after depressurization of the vessel.

4 Claims, 2 Drawing Figures

CLOSURE SYSTEM FOR PRESSURE VESSELS

BACKGROUND OF THE INVENTION

The invention relates to a closure system for pressure vessels including a closure for a vessel having at least one opening, wherein the closure system consists of a cover and of two clamp halves each of which can be moved into a closed or open position by means of guiding elements. The clamp halves, the cover, and the pressure vessel housing are typically equipped with movement limiting surfaces. The movement limiting surfaces of the clamp halves are adapted to cooperate with those of the cover and of the pressure vessel housing in the closed position. The closure system is especially suitable in instances where an entirely automatic closing of a pressure vessel, for example, is required. Typical pressure vessels with which the system may be satisfactorily employed are those suitable for operating at pressures of 10 bar and more, i.e. up to pressure exceeding 1000 bar.

In batch type operations, the filling and emptying of the associated pressure vessels require mechanization of the closing and opening procedure to effectively move the heavy covers and other closing elements into and out of open and closed positions by the employment of adequate devices.

It is known pressure vessel covers may be locked in a closed position by means of a bayonet catch which requires a linear movement in direction of the longitudinal vessel axis and a subsequent rotational movement. The inner part of a bayonet catch is unsuitable for batch type operations which use filling media, such as granular or fibrous substances, because such media tends to collect in the corners and recesses of the mechanism adversely affecting the resultant operation.

In other known closure devices, the flat cover is maintained in place in a closed position by a multiple clamp, the inner stop surfaces of which are caused to contact the associated cover and housing.

The closure systems known are not suitable for mechanization up to now because the heavy forces encountered during operation cause bending or distortion of the parts of the devices and excessive abrasion on the cooperating stop surfaces.

SUMMARY OF THE INVENTION

The object of the present invention is to eliminate the disadvantages encountered with closure devices hiterto used.

According to this invention the object is achieved by applying the measures outlined in the characterizing portion of the appended claims.

Certain of the special advantages realized with the invention include the mechanization of batch type operations utilizing pressure vessels can be achieved. Closing and opening times are considerably reduced by using a comparatively simple vessel and cover structures. The covers may be inserted axially into and out of a closed without requiring any rotational movement and contact the vessel housing rim. Two clamp halves may be moved into the closing position without contacting one another and the clamp halves will be contact-free after complete depressurization of the vessel. The clamp halves can then be removed without friction from the cover and the vessel housing counter rim. Thus, abrasion on the associated stop surfaces is eliminated.

As essential advantage of the present invention is that in closed position of the cover and during inner pressure vessel loading, any changes in the dimensional aspect of the cover (by millimeters or fractions thereof no inadmissible force, e.g.) caused by bending forces imposed thereon is not transferred to the associated guiding elements by way of cover and/or clamps. After depressurization of the vessel, the pressure exerted on the stop or contacting surfaces becomes zero. The stop surfaces may slightly move apart from one another to provide a clearance.

BRIEF DESCRIPTION OF THE DRAWINGS

The above, as well as other object and advantages of the invention will become readily manifest to one skilled in the art from reading the following detailed description of an embodiment of the invention when considered in the light of the accompanying drawings, in which.

DETAILED DESCRIPTION OF THE PREFERRED EMBODIMENT OF THE INVENTION

Figure 1:
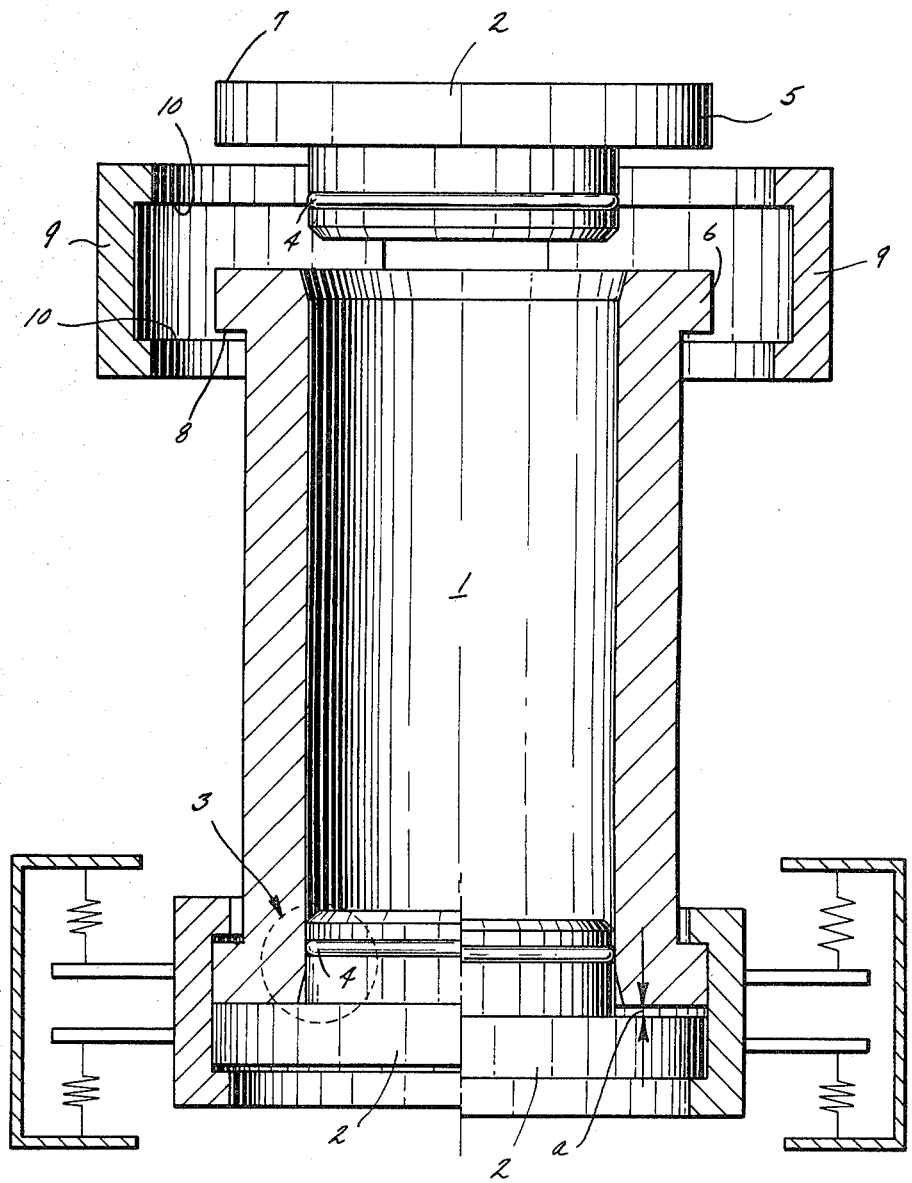
FIG. 1 is a cross sectional view of the pressure vessel having a closure system embodying the features of the invention.
Figure 2:
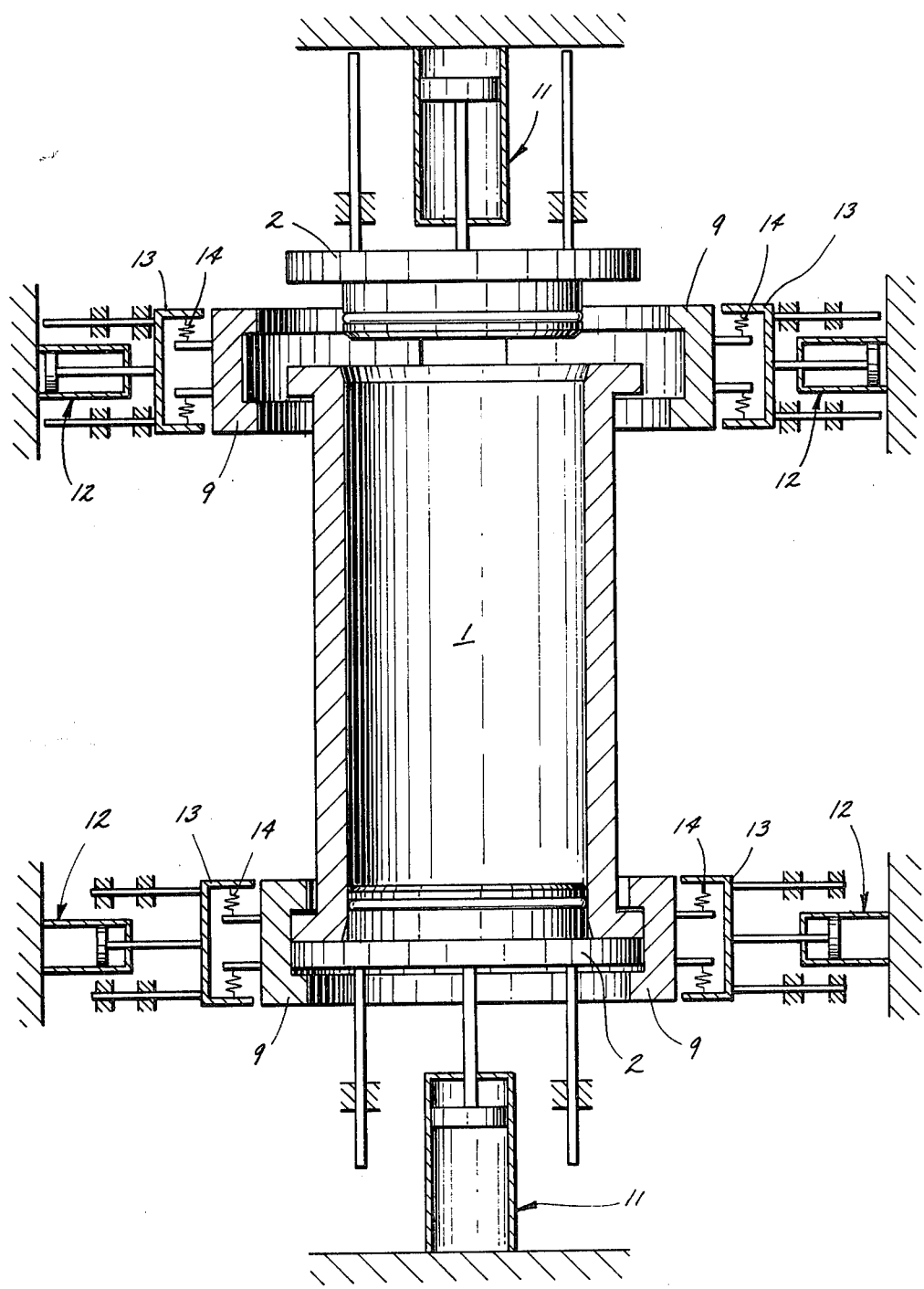
FIG. 2 is a cross sectional view showing the structure illustrated in FIG. 1 and including schematic representation of a vertical pressure vessel with clamp shifting device in closed (zero) and in open position.

FIGS. 1 and 2 illustrate a pressure vessel 1, designed for an operating pressure of 350 bar, which is adapted to be closed on both ends by suitable covers 2. The design of the covers 2 and the vessel 1 permits mechanical insertion and removal of the covers 2 without causing any damage to associated seals 4, such as an O-ring, for example.

The covers 2 include a peripheral rim portion 5 which is of substantially the same size and configuration of rim portions 6 extending outwardly of the upper and lower ends of the vessel 1. It will be understood that the corresponding facing surfaces of the rims 5 and 6 of the covers 2 and the vessel 1, respectively, may contact one another in a fully closed position. The opposite surfaces 7 and 8 of the rims 5 and 6 of the covers 2 and the vessel 1, respectively, are formed at right angles to the longitudinal axis of the vessel 1. The opposite surfaces 7 and 8 function as stop or motion limiting surfaces as will be explained in detail hereinafter.

Cooperating with the vessel 1 and covers 2, there is a pair of clamp halves 9 having a substantially channel or U-shaped cross section. The facing surfaces 10 of the inwardly extending rim portions of the clamp halves 9 are adapted to cooperate with surfaces 7 and 8 of the rims 5 and 6 of the covers 2 and the vessel 1, respectively. It will be appreciated that the drawings illustrate only a portion of each of the clamp halves 9.

The facing surfaces 10 of the clamp halves 9 are directly opposite to the stop surfaces 7 and 8 of the covers 2 and the vessel 1 without having any actual contact in the zero pressure position which illustrated in the lower left hand portion of FIG. 1. When the vessel 1 is pressurized, the covers 2 are caused to move into a position, illustrated in the lower right hand portion of FIG. 1 wherein the various motion limiting or stop surfaces are brought into contract with one another. The closing range is generally noted by reference numeral 3. The maximum travel of each clamp half 9 towards the outside of the vessel 1 in the direction along the longitudinal axis of the vessel 1 equals the contact tolerance generally indicated by "a" in FIG. 1.

In order to allow for a full mechanization of the closing and opening procedure of the pressure vessel 1 in accordance with the present invention, the covers 2 and the clamp halves 9 are designed as movable devices, as illustrated in FIG. 2. The stationary pressure vessel 1 is equpped with movable covers 2 and clamp halves 9. The covers 2 are adapted to be moved axially and vertically by cover shifting devices 11, as fluid motors, for example; and the clamp halves 9 are adapted to be moved horizontally and at a right angle to the longitudinal axis of the vessel 1 by clamp shifting devices 12. The clamp halves 9 are moved towards the outside until the covers 2 can be freely removed towards the top or the bottom of the vessel 1. The clamp halves 9 are connected by tensible flexible bearings 14, such as spring assemblies, for examples, to associated guiding elements 13 so that, when being charged with the operating pressure in closing position, they can move axially by the contact tolerance (a) without exerting any inadmissible force on the associated guiding elements 13. The flexible bearings 14 may also be operated pneumatically or hydraulically. They must be designed for automatic resetting of the clamp halves 9 into the zero pressure position after depressurization of the vessel 1. In case the spring assemblies 14 are being used their tension must be sufficient for moving the clamp halves 9 into the zero pressure position.

The zero pressure position is a position in which vessel housing 1 and the covers 2 are in contact with one another, whilst clamp halves 9 are not in contact with vessel housing 1 and covers 2.

If a pressure vessel 1 is of the horizontal type, the clamp halves 9 may slide or roll on suitable horizontal guiding means, such as tracks, for example. If the pressure vessel 1 consists of two semi-spherical parts, each such part functions as a housing and cover at the same time. In such case, it is sufficient to design one vessel half as movable section. The two clamp halves would be adapted to be moved in the same manner as described above.

We claim:

1. A closure system for a pressure vessel, the pressure vessel including an open ended housing having an axis and provided with a first rim portion adjacent the open end thereof, and a cover adapted to be sealingly coupled to the housing to close the open end, the cover provided with a second rim portion adjacent the first rim portion of the housing, said closure system comprising:

at least one clamp member having a channel formed therein for receiving at least a portion of the first and second rim portions of the pressure vessel to maintain the cover sealingly coupled to the open end of the housing; and tensible means for mounting said clamp member for axial movement reltive to the pressure vessel to permit limited axial movement of said clamp member relative to the housing when the pressure vessel is pressurized, said tensible means adapted to position said clamp member at a predetermined zero pressure axial position when the pressure vessel is depressurized.

2. The invention defined in claim 1 and further including guide means for moving said clamp member between an open position wherein the cover can be removed from the housing and a closed position wherein the cover is locked on the housing, said tensible means connected between said guide means and said clamp member to permit axial movement of said clamp member relative to said guide means.

3. The invention defined in claim 2 wherein said tensible means includes hydraulically actuated means.

4. The invention defined in claim 2 wherein said tensible means includes spring assemblies.

* * * * *